United States Patent [19]

Ogino et al.

[11] Patent Number: 5,659,020

[45] Date of Patent: Aug. 19, 1997

[54] TETRAKISAZO COMPOUND AND A POLARIZING FILM CONTAINING THE SAME

[75] Inventors: Kazuya Ogino, Minoo; Kaneo Yokoyama, Nara; Narutoshi Hayashi, Niihama; Takashi Omura, Kobe, all of Japan

[73] Assignee: Sumitomo Chemical Company, Limited, Osaka, Japan

[21] Appl. No.: 527,557

[22] Filed: Sep. 13, 1995

[30] Foreign Application Priority Data

Sep. 16, 1994 [JP] Japan ................................. 6-221990

[51] Int. Cl.$^6$ .............................. C09B 33/26; G02B 5/30
[52] U.S. Cl. ..................... 534/678; 534/684; 534/685; 534/714; 534/806; 252/585; 8/506
[58] Field of Search ........................... 534/684, 678, 534/685, 714, 806; 252/585

[56] References Cited

U.S. PATENT DOCUMENTS

| | | | |
|---|---|---|---|
| 2,215,087 | 7/1940 | Schweitzer | 534/667 |
| 2,858,302 | 10/1958 | Iselin et al. | 534/806 X |

FOREIGN PATENT DOCUMENTS

| | | |
|---|---|---|
| 1448152 | 8/1966 | France . |
| 1135596 | 8/1962 | Germany . |
| 59-145255 | 8/1984 | Japan . |
| 1-252904 | 10/1989 | Japan . |
| 6-128498 | 5/1994 | Japan . |
| 776711 | 6/1957 | United Kingdom . |
| 902228 | 8/1962 | United Kingdom . |

OTHER PUBLICATIONS

Derwent Abstract of JP 57-036693, Feb. 27, 1982.

Derwent Abstract of JP 01-167,703, Jul. 3, 1989.

*Primary Examiner*—Fiona T. Powers
*Attorney, Agent, or Firm*—Watson Cole Stevens Davis, PLLC

[57] ABSTRACT

A tetrakisazo compound of the formulae:

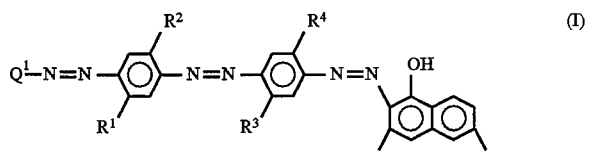

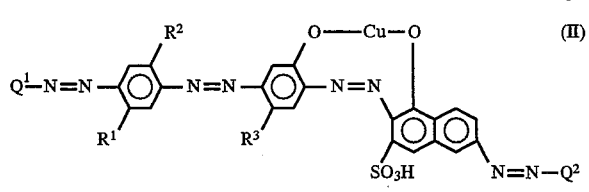

wherein $Q^1$ represents a phenyl or naphthyl group, $Q^2$ represents a phenyl which is substituted by at least one substituent selected from a hydroxy group and an amino group, and $R^1$, $R^2$, $R^3$ and $R^4$ each independently represents a hydrogen atom, a hydroxy group, a lower alkyl group, a lower alkoxy group or a substituted or unsubstituted amino group, or a salt thereof, and a polarizing film which comprises the tetrakisazo compound or a salt thereof and which may further comprise other organic dyes.

15 Claims, No Drawings

TETRAKISAZO COMPOUND AND A POLARIZING FILM CONTAINING THE SAME

The present invention relates to a tetrakisazo compound and a polarizing film containing the same.

Polarizing films have been generally produced by incorporating iodine or a dichromatic dye as a polarizing element into an oriented film made of polyvinyl alcohol or its derivatives, or into an oriented polyene film prepared by a dehydro chlorination of a polyvinyl chloride film or by a dehydration of a polyvinyl alcohol film so as to produce polyene in the film, followed by the orientation of the resulting film.

Among those, a iodine-containing polarizing film is good in early stage polarizing activities, but poor in the durability to moisture and heat. Thus, the film has some drawbacks in the lowered polarizing activities after having been used for a certain period of time at a high temperature under a highly humid condition. Several methods for improving the durability have been proposed, in which the film is treated with formalin or an aqueous boric acid solution, or a polymer film having a low moisture permeability is employed as a protecting film. However, these methods are not yet fully satisfactory.

A dye-containing polarizing film using a dichromatic dye as a polarizing element is superior in the durability to moisture and heat as compared with a iodine-containing polarizing film, but is inferior in the early stage polarizing activities. JP-A-59-145255 discloses a polarizing film containing a disazo dye having following structure:

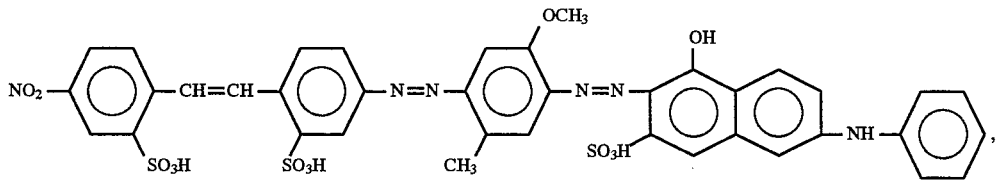

but the polarizing film does not yet fully satisfy properties demanded by users.

If a set of two polarizing films of neutral color containing two or more kinds of dichromatic dyes which are superposed on each other so that those orientation directions meet at right angles (hereinafter, this state is referred to as "crossed state") are pervious to light of a specific wavelength within the visible radiation wavelength region, particularly from 400 to 700 nm, a liquid crystal display using the two films often show a color different from the intended color at dark state.

In order to prevent the problem due to the light breaking through the films, transmittance of the polarizing films at crossed state (hereinafter, this is referred to as "cross light transmittance") must be lowered over the visible radiation wavelength region, particularly from 400 too 700 nm.

An object of the present invention is to provide a dye containing polarizing film excellent in polarizing activities as well as durability to moisture and heat.

Other object of the present invention is to provide a novel compound suitably used for producing the said polarizing film.

Further object of the present invention is to provide a polarizing film of neutral color containing two or more kinds of dichromatic dyes which is little pervious to light over the visible radiation wavelength region, particularly 400 to 700 nm at crossed state, and which is excellent in the polarizing activities as well as the durability to moisture and heat.

The present inventors have extensively studied to accomplish these objects, and have found a novel tetrakisazo compound. They have further found that a polarizing film containing the specific compound i.e. the novel tetrakisazo compound is excellent in polarizing activities as well as durabilities to moisture and heat. The present inventors have further found that a polarizing film containing the specific compound (=dye) and another specific dye used for making the film neutral color is not only excellent in polarizing activities and durability to moisture and heat but also is little pervious to light at crossed state over the visible radiation wavelength region. Thus, the present invention was accomplished.

The present invention provides a tetrakisazo compound represented by the following formulae (I) or (II):

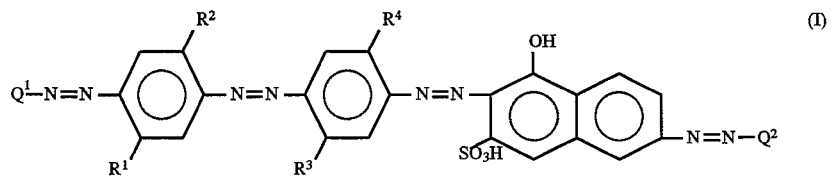

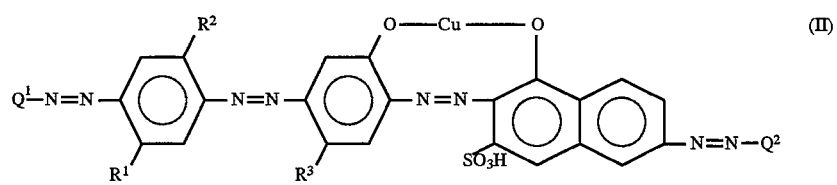

wherein $Q^1$ represents a substituted or unsubstituted phenyl group or a substituted or unsubstituted naphthyl group, $Q^2$ represents a phenyl group which is substituted by at least one substituent selected from a hydroxy group, a substituted amino group and an unsubstituted amino group, and which may be further substituted, and $R^1$, $R^2$, $R^3$ and $R^4$ each independently represents a hydrogen atom, a hydroxy group, a lower alkyl group, a lower alkoxy group or a substituted or unsubstituted amino group; or a salt thereof.

The present invention also provides a dye-containing polarizing film which comprises one or more kinds of the tetrakisazo compound of formulae (I) or (II), or a salt thereof, in a polarizing film substrate. The dye-containing polarizing film of the present invention is excellent in polarizing activities as well as durability to moisture and heat.

The dye-containing polarizing film of the present invention may further comprises other organic dye. Particularly preferred is the polarizing film which further comprises two or more dyes selected from following [A] and [B]:

[A] a trisazo dye which is a dye represented by the formula (Ia), a copper complex salt thereof or a salt of the dye of the formula (Ia) or of the copper complex salt

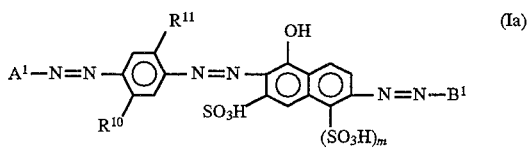

wherein:

$A^1$ and $B^1$, which are the same or different, each represent a substituted or unsubstituted phenyl group or a substituted or unsubstituted naphthyl group;

$R^{10}$ represents an amino group which may be optionally substituted, a hydrogen atom, a lower alkyl, lower alkoxy or sulfo group;

$R^{11}$ represents a hydrogen atom, a hydroxy or lower alkoxy group;

and m is 0 or 1; and

[B] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

Accordingly, the present invention also provides a dye-containing polarizing film which comprises at least one dye selected from tetrakisazo compounds of the formulae (I) or (II); and at least two dyes selected from the group consisting of the above-mentioned [A] and [B].

The phenyl group denoted by $Q^1$ in formulae (I) or (II) is unsubstituted or substituted by one or more substituent such as a nitro, sulfo, sulfamoyl, alkyl, alkoxy, hydroxy, unsubstituted or substituted amino, carboxy or halogeno group. Examples of the substituent of the amino group include a methyl, ethyl, acetyl and β-hydroxyethyl group.

Preferable examples of the phenyl group denoted by $Q^1$ in formulae (I) or (II) include an unsubstituted phenyl, or a phenyl substituted by one or two substituents selected from a nitro, sulfo, sulfamoyl, $C_1$–$C_4$ alkyl, $C_1$–$C_4$ alkoxy, hydroxy, unsubstituted or substituted amino, carboxy and halogeno group. The preferred phenyl group denoted by $Q^1$ is represented by the following formula:

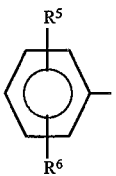

wherein $R^5$ and $R^6$ each independently represent a hydrogen atom, or a nitro, sulfo, sulfamoyl, $C_1$–$C_4$ alkyl, $C_1$–$C_4$ alkoxy, hydroxy, unsubstituted or substituted amino, carboxy or halogeno group. Among them, particularly preferred is a phenyl group substituted by a nitro, sulfo, sulfamoyl, methyl, ethyl, methoxy, ethoxy, carboxy group(s) or a chlorine atom(s).

The naphthyl group denoted by $Q^1$ in formulae (I) or (II) is unsubstituted or substituted by one or more substituents such as a hydroxy or sulfo group. Preferable examples of the naphthyl group denoted by $Q^1$ include an unsubstituted 2-naphthyl group and 2-naphthyl group substituted by one, two or three substituents selected from a hydroxy group and a sulfo group. The preferred naphthyl group denoted by $Q^1$ is represented by the following formula:

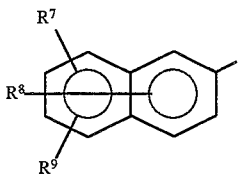

wherein $R^7$, $R^8$ and $R^9$ each independently represent a hydrogen atom, or a hydroxy or sulfo group. Among them, particularly preferred is a naphthyl group substituted by one or two sulfo groups.

The phenyl group denoted by $Q^2$ in formulae (I) or (II) is substituted by at least one substituent selected from a hydroxy group, an unsubstituted amino group and a substituted amino. Examples of the substituent of the amino group include a methyl, ethyl, β-hydroxyethyl, β-cyanoethyl, acetyl, carbamoyl and methylsulfonyl group. The phenyl group denoted by $Q^2$ in formulae (I) or (II) may be further substituted by one or more other groups such as a sulfo, $C_1$–$C_4$ alkyl, $C_1$–$C_4$ alkoxy and carboxy group. As the phenyl group denoted by $Q^2$ in formulae (I) or (II), the following ① or ② is preferred.

① A phenyl group which is substituted once, twice or three times by hydroxy groups, and which may be further substituted by an unsubstituted or substituted amino group, or a sulfo, alkyl, alkoxy or carboxy group.

② A phenyl group which is substituted once or twice by an unsubstituted or substituted amino groups, and which may be further substituted by a hydroxy, sulfo, alkyl, alkoxy or carboxy group.

Among the above, a particularly preferred example of the phenyl group denoted by $Q^2$ is 4-hydroxyphenyl.

$R^1$, $R^2$ and $R^3$ in formula (I) or (II) and $R^4$ in formula (I) each independently represent a hydrogen atom, a hydroxy group, a lower alkyl group, a lower alkoxy group or a substituted or unsubstituted amino group. In this specification, the term "lower" used to qualify a group such as alkyl or alkoxy means "having one to about four carbon atoms. Examples of the substituent of the amino group include a methyl, ethyl, acetyl, carbamoyl and methylsulfonyl group. Preferred examples of $R^1$, $R^2$ and $R^3$ in formulae (I) or (II) and $R^4$ in formula (I) include a hydrogen atom and a hydroxy, methyl, ethyl, methoxy, ethoxy, acetylamino, methylsulfonyl amino, ureido and methyl amino group.

The tetrakisazo compound of formula (II) is same to the tetrakisazo compound of formula (I) except that $R^4$ is a hydroxy group, and that the hydroxy group denoted by $R^4$ and the hydroxy group of 1-hydroxy-3-sulfo-2,6-naphthylene form a copper complex salt.

The tetrakisazo compound of formula (I) can be produced, for example, by conducting steps (1) to (4) mentioned below.

(1) An aromatic amine compound represented by the following formula (III):

wherein $Q^1$ is as defined above, is diazotized according to a conventional manner, and the resulting diazonium compound is coupled with an aniline compound represented by the following formula (IV);

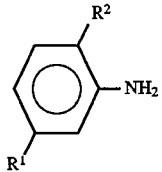

wherein $R^3$ and $R^4$ are as defined above, or with an ω-methansulfonated compound thereof.

(2) After the product obtained in the step (1) is hydrolyzed, if necessary, it is diazotized according to a conventional manner, and the resulting compound is coupled with an aniline compound represented by the following formula (V);

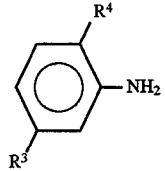

wherein $R^3$ and $R^4$ are as defined above, or with an ω-methansulfonated compound thereof.

(3) After the product obtained in the step (2) is hydrolyzed, if necessary, it is diazotized according to a conventional manner, and the resulting compound is coupled with 3-amino-8-naphthol-6-sulfonic acid represented by the following formula (VI);

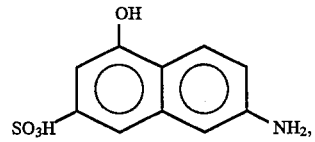

or with a salt thereof.

(4) Then, the product obtained in the step (3) is diazotized according to a conventional manner and the resulting compound is coupled with an benzene compound represented by the following formula (VII);

wherein $Q^2$ is as defined above, to obtain a tetrakisazo compound of formula (I).

A tetrakisazo compound of formula (I) can also be obtained through a process same to the above-mentioned except that the step (3) and (4) are replaced by the following steps (5) and (6).

(5) 3-Amino-8-naphthol-6-sulfonic acid of formula (VI) or a salt thereof is diazotized according to a conventional manner, and the resulting compound is coupled with an benzene compound of formula (VII).

(6) After the product obtained in the step (2) is hydrolyzed, if necessary, it is diazotized according to a conventional manner, and the resulting compound is coupled with the compound obtained in the step (5).

A tetrakisazo compound of formula (II) can be obtained by conducting the same steps as to the above-mentioned steps for producing a tetrakisazo compound of formula (I) except that the aniline compound of formula (V) or an ω-methansulfonated compound thereof is replaced with an aniline compound represented by the following formula (Va)

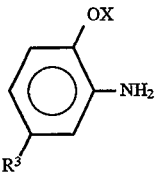

wherein X is a hydrogen atom or a methyl group and $R^3$ is as defined above, or an ω-methansulfonated compound thereof, to obtain a tetrakisazo compound; and then reacting the tetrakisazo compound thus obtained to form a copper complex salt thereof according to a conventional method.

A tetrakisazo compound of formula (I) wherein $R^4$ is a hydroxy group can be obtained from a tetrakisazo compound of formula (II) (=copper complex salt) by subjecting the tetrakisazo compound of formula (II) to a conventional demetalization, to a treatment in a strong acidic aqueous medium or to a demetalization by using a chelating agent such as ethylenediamine tetraacetic acid.

Examples of an aromatic amine compound of formula (III) include aniline, 2-nitroaniline, 3-nitroaniline, 4-nitroaniline, 2-aminobenzene sulfonic acid, 3-aminobenzene sulfonic acid, 4-aminobenzene sulfonic acid, 5-aminobenzene-1,3-disulfonic acid, 2-aminobenzene-1,4-disulfonic acid, 4-aminobenzene-1,2-disulfonic acid, 2-sulfamoyl aniline, 3-sulfamoyl aniline, 4-sulfamoyl aniline, 2-aminobenzoic acid, 3-aminobenzoic acid, 4-aminobenzoic acid, 2-chloroaniline, 3-chloroaniline, 4-chloroaniline, 2,5-dichloroaniline, 2-bromoaniline, 3-bromoaniline, 4-bromoaniline, 2-methylaniline, 3-methylaniline, 4-methylaniline, 2-ethylaniline, 3-ethylaniline, 4-ethylaniline, 2-methoxylaniline, 3-methoxylaniline, 4-methoxylaniline, 2-ethoxylaniline, 3-ethoxylaniline, 4-ethoxylaniline, 2-hydroxylaniline, 3-hydroxylaniline, 4-hydroxylaniline, 4-di(β-hydroxyethyl) aminoaniline, 1-aminonaphthalene-4-sulfonic acid, 1-aminonaphthalene-5-sulfonic acid, 1-aminonaphthalene-6-sulfonic acid, 1-aminonaphthalene-7-sulfonic acid, 1-aminonaphthalene-8-sulfonic acid, 2-aminonaphthalene-1-sulfonic acid, 2-aminonaphthalene-5-sulfonic acid, 2-aminonaphthalene-6-sulfonic acid, 2-aminonaphthalene-7-sulfonic acid, 2-aminonaphthalene-8-sulfonic acid, 1-aminonaphthalene-4,7-disulfonic acid, 1-aminonaphthalene-4,6-disulfonic acid, 1-aminonaphthalene-3,7-disulfonic acid, 1-aminonaphthalene-3,8-disulfonic acid, 1-aminonaphthalene-3,6-disulfonic acid, 2-aminonaphthalene-4,8-disulfonic acid, 2-aminonaphthalene-6,8-disulfonic acid, 2-aminonaphthalene-3,6-disulfonic acid, 2-aminonaphthalene-1,5-disulfonic acid, 2-aminonaphthalene-5,7-disulfonic acid, 1-aminonaphthalene-3,6,8-trisulfonic acid, 2-aminonaphthalene-3,6,8-trisulfonic acid, 2-aminonaphthalene-4,6,8-trisulfonic acid, 2-amino-5-hydroxynaphthalene-7-sulfonic acid, and 2-amino-8-hydroxynaphthalene-6-sulfonic acid.

Examples of an aniline compound of formula (IV) or (V) include aniline, 2-methylaniline, 3-methylaniline, 2-ethylaniline, 3-ethylaniline, 2-methoxylaniline, 3-methoxylaniline, 2-ethoxylaniline, 3-ethoxylaniline, 2-hydroxylaniline, 3-hydroxylaniline, 3-acetylamino aniline, 3-carbamoyl amino aniline, 2-methoxy-5-methylaniline, 2,5-dimethoxylaniline, 2,5-diethoxylaniline and 3-methylsulfonyl amino aniline.

Examples of an aniline compound of formula (Va) include 2-methoxylaniline, 2-hydroxylaniline, 2-methoxy-5-methylaniline and 2,5-dimethoxylaniline.

A benzene compound of formula (VII) may be aniline or a derivative thereof, phenol or a derivative thereof, an aminophenol or a derivative thereof, or the like. Examples of a benzene compound of formula (VII) include aniline, 1,3-diaminobenzene, 1,3-diamino-4-methylbenzene, 2,4-diaminobenzene sulfonic acid, 3-acetylamino aniline, 3-carbamoyl amino aniline, 2-methylaniline, 3-methylaniline, 2-ethylaniline, 3-ethylaniline, 2-methoxylaniline, 3-methoxylaniline, 2-ethoxylaniline, 3-ethoxylaniline, 2-methoxy-5-methylaniline, 2-methoxy-5-ethoxylaniline, 2,5-dimethoxylaniline, 2,5-diethoxylaniline, 2-methoxy-5-carbamoyl amino aniline, 3-methylsulfonyl amino aniline, 1-acetylamino-4-methoxy-3-di($\beta$-hydroxyethyl)amino benzene, phenol, resorcinol, phloroglucinol, 2-methylphenol, 3-methylphenol, 4-methylphenol, 2-hydroxy benzoic acid, 2-aminophenol, 3-aminophenol, 5-amino-2-methylphenol, 3-diethylaminophenol and 3-di($\beta$-hydroxyethyl)amino] phenol. Among the above-mentioned compounds, phenol and aniline can be mentioned as a preferred example of a benzene compound of formula (VII).

The tetrakisazo compound of formula (I) or (II) is used as it is, i.e. in the form of free acid or as in the form of salt, such as lithium salt, sodium salt, potassium salt, ammonium salt, ethanolamine salt or alkylamine salt. Among the free acid and the salts, sodium salt is preferably used for producing a polarizing film of the present invention.

As mentioned above, the polarizing film of the present invention, which comprises a tetrakisazo compound of formula (I) or (II), may further comprise other organic dyes to modify the color tone or to improve the polarizing activities. Any dyes can be used as the other organic dyes, as long as they have high dichromatic activity and also have the absorption ranges different to those of the tetrakisazo compound of formula (I) or (II). Examples of the other organic dyes include the above mentioned trisazo dyes [A] and the following dyes which are described in Color Index:

C.I. Direct Yellow 12, C.I. Direct Yellow 28, C.I. Direct Yellow 44, C.I. Direct Yellow 142, C.I. Direct Orange 6, C.I. Direct Orange 26, C.I. Direct Orange 39, C.I. Direct Orange 107, C.I. Direct blue 1, C.I. Direct blue 15, C.I. Direct blue 71, C.I. Direct blue 78, C.I. Direct blue 98, C.I. Direct blue 168, C.I. Direct blue 202, C.I. Direct Red 2, C.I. Direct Red 31, C.I. Direct Red 79, C.I. Direct Red 81, C.I. Direct Red 240, C.I. Direct Red 247, C.I. Direct Brown 106, C.I. Direct Brown 223, C.I. Direct Violet 9, C.I. Direct Violet 51 and C.I. Direct Green 85.

Among polarizing films which comprise a tetrakisazo compound of formula (I) or (II) and other organic dyes, a polarizing film which comprises at least one dye selected from tetrakisazo compounds of formula (I) or (II); and at least two dyes selected from the above-mentioned group consisting of the above-mentioned [A] and [B] is more preferred. The more preferred polarizing film has neutral color and is very little pervious to light at crossed state over the visible radiation wavelength region, particularly from 400 to 700 nm. In addition, the more preferred polarizing film is excellent in polarizing activities and causes no discoloration and deterioration of polarizing activities under a high temperature and high humid conditions. Among the more preferred polarizing film, a polarizing film which comprises one dye of formula (I), one dye selected from group [A], and one dye selected from group [B] is particularly preferred.

In formula (Ia), $A^1$ and $B^1$ each independently represent a substituted or unsubstituted phenyl, or a substituted or unsubstituted naphthyl. Examples of the substituent of the phenyl group include sulfo, sulfamoyl, nitro, $C_1$–$C_4$ alkyl, $C_1$–$C_4$ alkoxy, carboxy, hydroxy, halogen and unsubstituted or substituted amino. Examples of the substituent of the naphthyl group include sulfo, hydroxy and unsubstituted or substituted amino. The substituted amino may be either monosubstituted amino or disubstituted amino. Examples of the substituent of the amino group include $C_1$–$C_4$ alkyl, $C_1$–$C_4$ alkyl substituted by hydroxy or cyano, $C_1$–$C_4$ alkylcarbonyl, phenyl, sulfophenyl, disulfophenyl, benzyl and carbamoyl.

The phenyl group denoted by $A^1$ is preferably phenyl which is substituted by one or two substituents selected from sulfo, sulfamoyl, nitro, methyl, ethyl, methoxy, ethoxy, carboxy, chlorine, unsubstituted amino and substituted amino. Particularly preferred as the phenyl group denoted by $A^1$ is sulfophenyl. The naphthyl group denoted by $A^1$ is preferably naphthyl substituted by one, two or three sulfo groups. Particularly preferred as the naphthyl group denoted by $A^1$ is monosulfonaphthyl or disulfonaphthyl.

As the phenyl denoted by $B^1$, one of the following is preferred:

① phenyl which is substituted by one or two amino groups which may be optionally substituted, and may be further substituted by hydroxy, sulfo, $C_1$–$C_4$ alkyl, $C_1$–$C_4$ alkoxy or carboxy, or ② phenyl which is substituted by one, two or three hydroxy groups, and may be further substituted by amino, which may be optionally substituted, sulfo, $C_1$–$C_4$ alkyl, $C_1$–$C_4$ alkoxy or carboxy.

As the naphthyl denoted by $B^1$, one of the following is preferred:

① naphthyl which is substituted by one or two hydroxy groups and which may be further substituted by sulfo, unsubstituted amino or amino which is substituted by methyl, acetyl, phenyl, sulfophenyl, disulfophenyl or benzoyl, or ② naphthyl which is substituted once or twice by unsubstituted amino or amino which is substituted by methyl, ethyl, hydoxyethyl, cyanoethyl, acetyl or carbamoyl and which may be further substituted by hydroxy or sulfo.

In formula (Ia), $R^{10}$ is hydrogen, lower alkyl, lower alkoxy, sulfo or amino which may be optionally substituted. The substituted amino can be either mono-substituted amino or di-substituted amino. Examples of the substituent of the amino include $C_1$–$C_4$ alkyl, $C_1$–$C_4$ alkylcarbonyl, $C_1$–$C_4$ alkylsulfonyl and carbamoyl. $R^{11}$ is hydrogen, hydroxy or lower alkoxy. When the trisazo dye of formula (Ia) forms a copper complex salt, the copper complex salt is formed between the hydroxy group of the 1-hydroxy-3-sulfo-2,6-naphthylene group (which may have sulfo at 5-position) and the hydroxy group denoted by $R^{11}$.

The trisazo dye [A] can be produced according to a known process such as a process described in JP-A-2-75672 which comprises a conventional diazotization and coupling reaction and, when the dye forms a copper complex salt, further comprises a formation of copper complex salt.

Preferable examples of the trisazo dye [A] include dyes represented by the formulae (A-1)–(A-12) mentioned below and salts thereof.

These dyes are usually used in the form of sodium salt, though they can also be used in the form of free acid, other alkali metal salt, such as litium salt or potassium salt, ammonium salt or amine salt, such as ethanolamine salt or alkylamine salt.

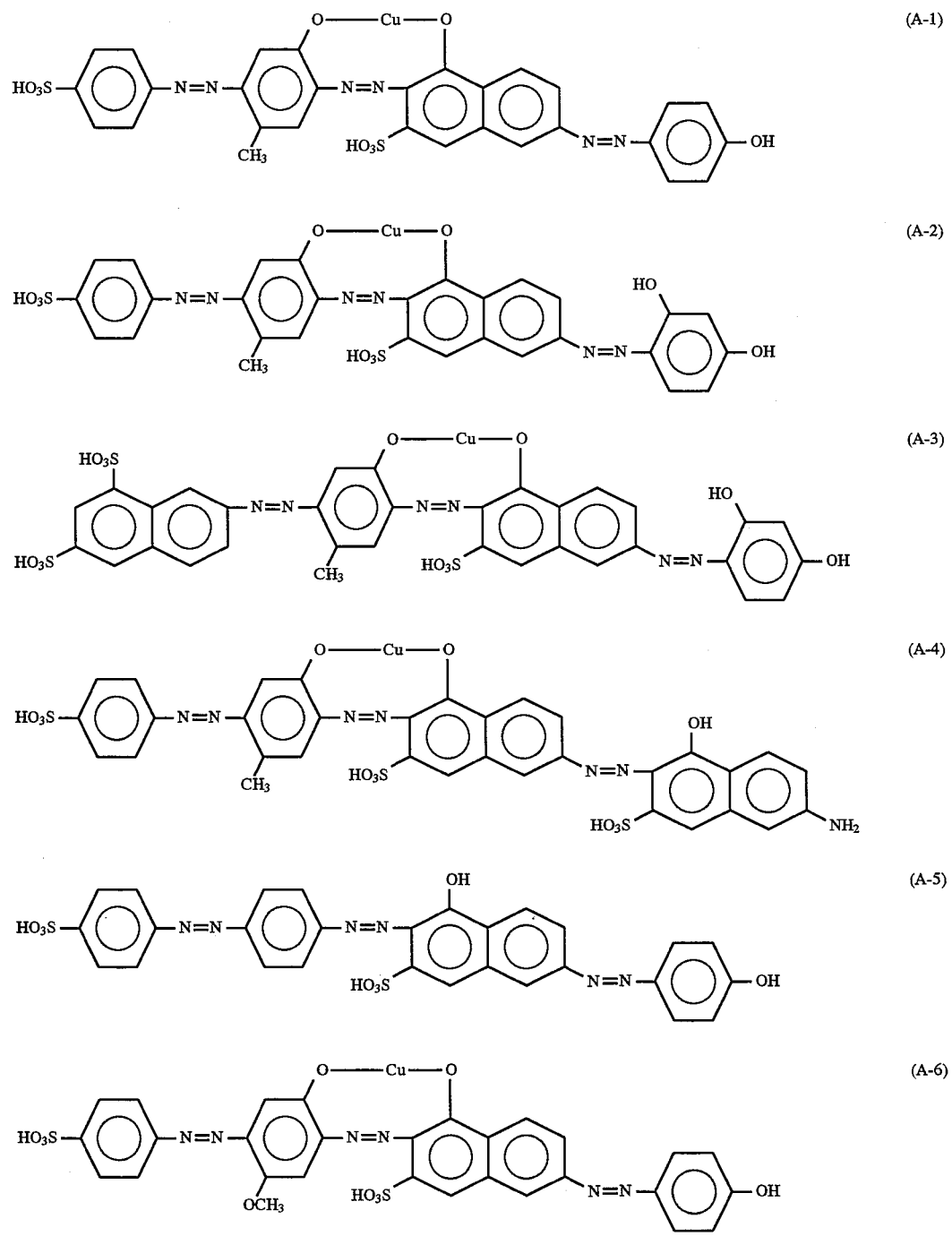

-continued

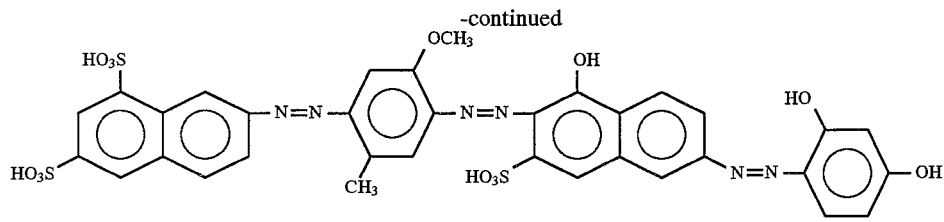
(A-7)

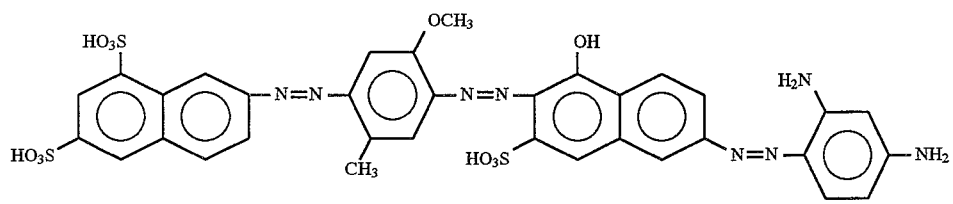
(A-8)

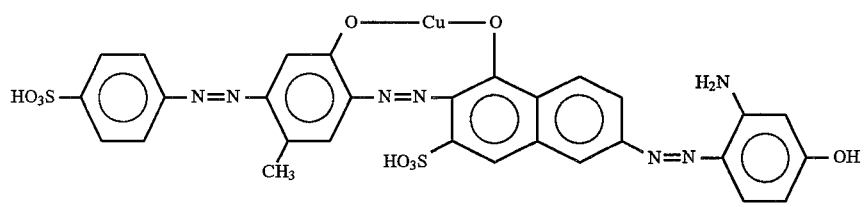
(A-9)

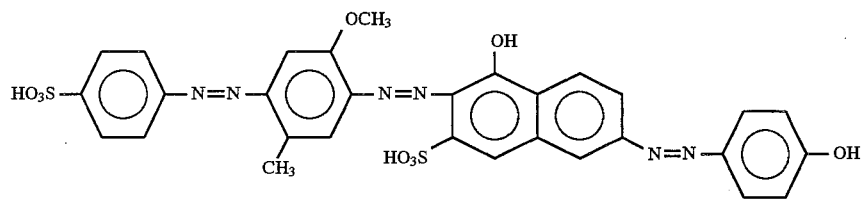
(A-10)

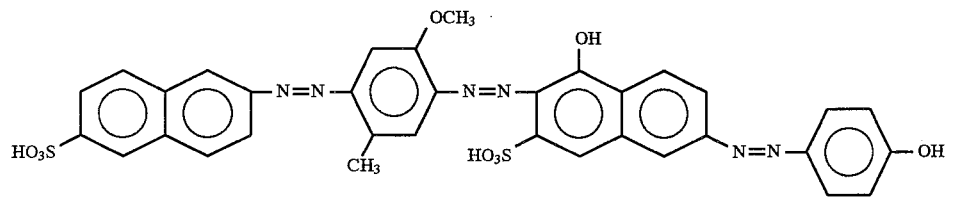
(A-11)

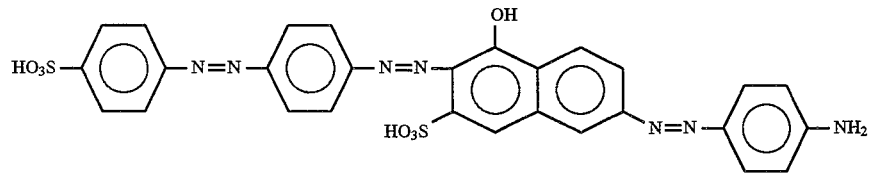
(A-12)

The dyes of [B] are commercially available and can be obtained easily. They are on the market by Sumitomo Chemical Co., Ltd. and their Color Index Generic Names and trade names are described below:

C.I. Direct Yellow 12 (trade name: Chrysophenine),
C.I. Direct Yellow 28 (trade name: Sumilight Supra Yellow BC conc.),
C.I. Direct Yellow 44 (trade name: Direct Fast Yellow GC),
C.I. Direct Orange 26 (trade name: Direct Fast Orange S),
C.I. Direct Orange 39 (trade name: Sumilight Supra Orange 2GL 125%),
C.I. Direct Orange 107 (trade name: Sumilight Supra Orange GD extra conc.),
C.I. Direct Red 2 (trade name: Benzopurpurine 4B),
C.I. Direct Red 31 (trade name: Nippon Fast Red BB conc.),
C.I. Direct Red 79 (trade name: Sumilight Supra Red 4BL 170%),
C.I. Direct Red 81 (trade name: Sumilight Red 4B) and
C.I. Direct Red 247 (trade name: Japanol Fast Red FA).

The polarizing film of the present invention can be produced by incorporating dichromatic dyes consisting of a tetrakisazo compound of formula (I) or (II) and, if desired, other organic dyes, into a polymer film as the substrate of polarizing film according to a known method.

Examples of a polymer film usable as the substrate of the polarizing film include polyvinyl alcohol or derivatives thereof; the same which is modified with an olefin such as ethylene and propylene or with an unsaturated fatty acid such as crotonic acid, acrylic acid, methacrylic acid or maleic acid; EVA (ethylene-vinyl acetate) resin; a saponified EVA resin; a nylon resin; and a polyester resin. A film made of polyvinyl alcohol or derivatives thereof is particularly preferred from the view points of the dye fixation and the orientation.

Incorporation of the dichromatic dye into a polymer film is carried out usually by dyeing the polymer film. The dyeing is, for example, carried out by dipping the polymer film in a dye bath prepared by dissolving the dichromatic dye in water. Though the dye concentration in the dye bath is not limited, it is usually in the range from 0.0001 to 10% by weight. If desired, a dyeing auxiliary, such as sodium sulfate may be used. Preferably, the concentration of sodium sulfate is from 1 to 10% by weight. Dyeing temperature is preferably from about 40° to about 80° C.

The orientation of the dichromatic dye incorporated in the polymer film is conducted by stretching the film. Stretching the polymer film can be conducted according to a known method such as a wet stretching method or a dry stretching method. The stretching the film may be conducted prior to the dyeing.

When two dyes selected from above-mentioned groups [A] and [B] are used in addition to the tetrakisazo compound of formula (I) and/or (II), their ratio is not critical, but usually the ratio of the total weight of the two or more dyes selected from groups [A] and [B] to the total weight of the tetrakisazo compound of formula (I) and/or (II) is in the range of from 0.1:1 to 5.0:1.

If desired, the oriented polymer film containing the dichromatic dyes is subjected to a post-treatment such as a boric acid treatment according to a known manner in order to improve the light transmittance and polarizing activities of the polarizing film. Conditions for the boric acid treatment vary depending on the kinds of the polymer film and the kinds of dichromatic dyes employed. Usually, however, the treatment is carried out in an aqueous boric acid solution having the concentration of from 1 to 5% by weight, preferably from 5 to 10% by weight, at a temperature of from 30° to 80° C., preferably from 50° to 75° C.

If desired, the polymer film may further be subjected to a fixing treatment in an aqueous solution containing a cationic polymer compound.

The dye-containing polarizing film thus obtained may be laminated with a protective film having excellent optical transparency and mechanical strength, on one or both sides of the film, to produce a polarizing plate. Examples of the materials used for producing the protective film include a fluorine type film such as a tetrafluoro ethylene/hexafluoro propylene copolymer film, a polyester resin film, a polyolefin resin film and a polyamide resin film, as well as a cellulose acetate film and an acrylic film which have been conventionally used.

As mentioned above, a polarizing film having excellent polarizing activities and durability to moisture and heat can be obtained by incorporating the tetrakisazo compound of formula (I) and/or (II) to a film substrate.

A polarizing film having neutral color which keeps the excellent polarizing activities and durability can be obtained by incorporating an other organic dye(s) in addition to the tetrakisazo compound of formula (I) and/or (II). Particularly, by incorporating at least two dyes selected from the above-mentioned group [A] and [B] in addition to the tetrakisazo compound of formula (I) and/or (II), a polarizing film which is little pervious to light at crossed state over the visible wavelength region and which keeps the excellent polarizing activities and durability can be obtained.

As mentioned above, a tetrakisazo compound of formula (I) or (II) is useful as a dye, particularly as a dichromatic dye to be incorporated into a dye-containing polarizing film. The dye-containing polarizing film containing the tetrakisazo compound of formula (I) or (II) not only exhibits high polarizing activities not smaller than those of a iodine containing polarizing film but also has excellent durability to moisture and heat. Hence, the polarizing film of the present invention is preferably applied to a variety of liquid crystal displays, particularly to displays for motor vehicles which require high polarizing activities and durability and to displays for industrial instruments used in a variety of circumstances.

The present invention is now explained in more details with reference to the examples, which are only illustrative, and never construed to limit the invention. In the examples, "part" and "%" mean "part by weight" and "% by weight" respectively unless otherwise mentioned.

EXAMPLE 1

To 200 parts of water dispersing 17.3 parts of sulfanilic acid, 20.9 parts of 35% hydrochloric acid and then 6.9 parts of sodium nitrite were added, and the resulting mixture was stirred for 1 hour at 5° C. After 15.3 parts of 2,5-dimethoxyaniline was added to the mixture, it was stirred for 1 hour at 5°–10° C., thereafter was adjusted to pH 3 by adding sodium carbonate and then it was stirred again to complete the coupling reaction. The resulting mixture was filtered to obtain a monoazo compound.

Subsequently, to 300 parts of water dispersing the monoazo compound thus obtained, 20.9 parts of 35% hydrochloric acid and then 6.9 parts of sodium nitrite were added, and the resulting mixture was stirred at 10°–15° C. to conduct a diazotization. After 15.3 parts of 2,5-dimethoxyaniline was added to the mixture, it was stirred for 1 hour at 10°–15° C., thereafter was adjusted to pH 3 by adding sodium carbonate and then it was stirred again to complete the coupling reaction. The resulting mixture was filtered to obtain a disazo compound.

Subsequently, to 400 parts of water dispersing the disazo compound thus obtained, 20.9 parts of 35% hydrochloric acid and then 6.9 parts of sodium nitrite were added, and the resulting mixture was stirred at 10°–15° C. to conduct a diazotizationo The diazotized compound of the disazo compound thus obtained was added to a mixture at pH 8 which was obtained by adding 24.0 parts of 3-amino-8-naphthol-6-sulfonic acid to 240 parts of water and then adding sodium carbonate thereto at 10°–15° C. to adjust its pH at 8. Thereafter, the resulting mixture was stirred to complete the coupling reaction, then was subjected to a salting out with sodium chloride and then was filtered to obtain a trisazo compound.

Subsequently, to 500 parts of water dispersing the trisazo compound thus obtained, 20.9 parts of 35% hydrochloric acid and then 6.9 parts of sodium nitrite were added, and the resulting mixture was stirred at 10°–15° C. for one hour. After 9.4 parts of phenol was added to the mixture, it was adjusted to pH 9 by adding sodium hydroxide, and then it was stirred again to complete the coupling reaction. The reaction mixture thus obtained was subjected to a salting out with sodium chloride and then was filtered to obtain a tetrakisazo compound of the following formula:

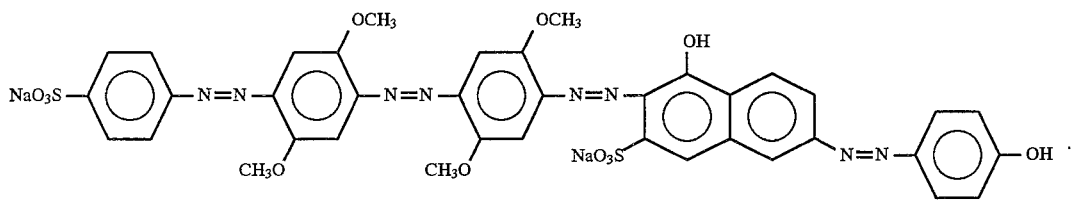

Measured in an aqueous medium, $\lambda_{max}$ of this compound is 622 nm.

EXAMPLE 2

24.0 Parts of 3-amino-8-naphthol-6-sulfonic acid was dispersed to 240 parts of water and was dissolved by adding 12 parts of sodium hydroxide thereto. 19.1 Parts of p-toluenesulfonyl chloride was added to the resulting solution which was thereafter stirred for 1 hour at 35°–40° C. Then, to the resulting reaction solution, 41.8 parts of 35% hydrochloric acid and then 6.9 parts of sodium nitrite were added, and the resulting mixture was stirred for 1 hour at 5° C. Subsequently, 9.4 parts of phenol was added to the reaction mixture, thereafter the reaction mixture was adjusted to pH 9 by adding sodium hydroxide, and then it was stirred again at 5°–10° C. to complete the coupling reaction. The resulting compound thus obtained was hydrolyzed by adding 6 parts of sodium hydroxide to the reaction mixture and stirring the reaction mixture at 80° c. for 3 hours. Thereafter, the reaction mixture was cooled to 20°–30° C., subsequently it was adjusted to pH 7 by adding 35% hydrochloric acid, then was subjected to a salting out with sodium chloride, and then it was filtered to obtain a monoazo compound(M).

To 300 parts of water dispersing 29.9 parts of 4-aminoazobenzene-4'-sodium sulfonate, 20.9 parts of 35% hydrochloric acid and then 6.9 parts of sodium nitrite were added, and the resulting mixture was stirred at 10°–15° C. to conduct the diazotization. Then, 15.3 parts of 2,5-dimethoxyaniline was added to the resulting mixture and it was stirred for 1 hour at 10°–15° C. Thereafter the reaction mixture was adjusted to pH 3 by adding sodium carbonate, then was stirred again to complete the coupling reaction, and then was filtered to obtain a disazo compound.

Subsequently, to 400 parts of water dispersing the disazo compound thus obtained, 20.9 parts of 35% hydrochloric acid and then 6.9 parts of sodium nitrite were added, and the resulting mixture was stirred at 10°–15° C. to conduct a diazotization. To the disazodiazo compound thus obtained, monoazo compound(M) mentioned above was added and then sodium carbonate was added thereto to adjust its pH at 9 and the reaction was conducted at 10°–15° C. for 3 hours. Thereafter, the resulting mixture was subjected to a salting out with sodium chloride and then was filtered to obtain a tetrakisazo compound of the following formula:

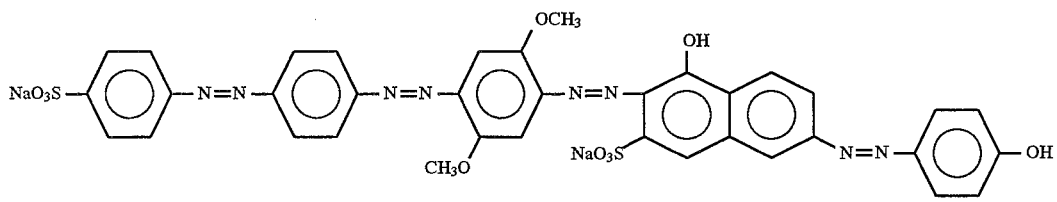

Measured in an aqueous medium, $\lambda_{max}$ of this compound is 597 nm.

EXAMPLE 3

Example 1 was repeated, except that sulfanilic acid is replaced with 30.3 parts of 2-aminonaphthalene-6,8-disulfonic acid to obtain a tetrakisazo compound of the following formula:

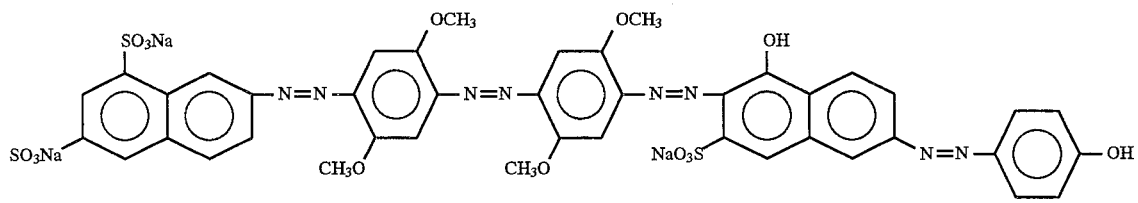

Measured in an aqueous medium, $\lambda_{max}$ of this compound is 622 nm.

EXAMPLE 4

To 500 parts of water dispersing the tetrakisazo compound obtained in Example 2, 16.0 parts of anhydrous copper sulfate and 3 parts of monoethanol amine were added.

The resulting mixture was heated at 95° C. for 12 hours to conduct the reaction. Thereafter, sodium chloride was added to conduct a salting out, and the resulting mixture was filtered to obtain a tetrakisazo compound of the following formula:

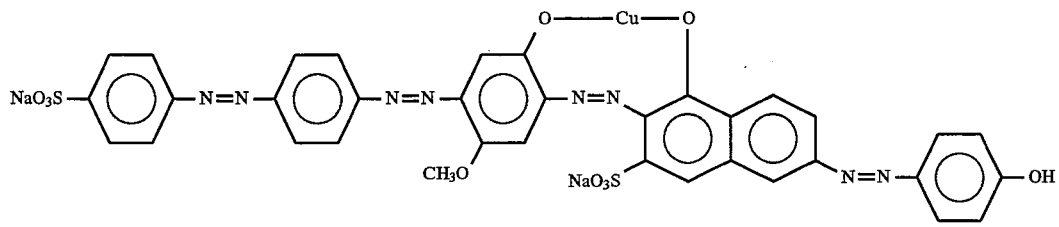

Measured in an aqueous medium, $\lambda_{max}$ of this compound is 649 nm.

EXAMPLE 5

To 500 parts of water dispersing the compound obtained in Example 4, 29.3 parts of ethylenediamine tetraacetic acid was added. After adding sodium hydroxide thereto to adjust the pH at 5, the resulting mixture was stirred for 3 hours at 30°–40° C. The resulting reaction mixture was filtered to obtain a tetrakisazo compound of the following formula:

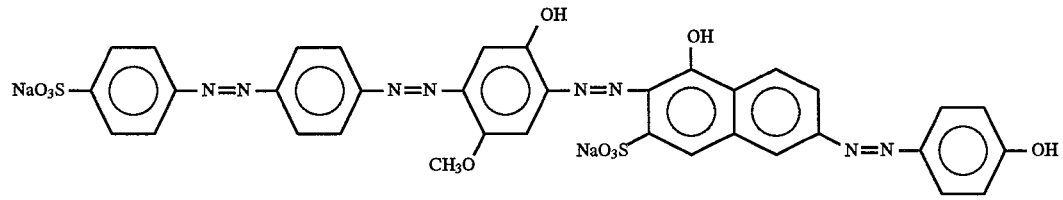

Measured in an aqueous medium, $\lambda_{max}$ of this compound is 597 nm.

EXAMPLE 6

A polyvinyl alcohol film of 75 μm in thickness (Kuraray Vinylon #7500 manufactured by Kuraray Co., Ltd.) was stretched to four times of its original length in a longitudinal uniaxial direction to prepare the substrate of a polarizing film. The resulting film was dipped for 20 minutes, as kept in the tensional state, into a 0.025% aqueous solution of the tetrakisazo compound obtained in Example 1 which further contains sodium sulfate, as a dyeing auxiliary, at a concentration of 2.0% at 60° C. Thereafter, the film was dipped into 7.5% aqueous boric acid solution at 65° C. for 5 minutes, then washed with water at 20° C. for 20 seconds, and then dried at 50° C. to obtain a polarizing film. The polarizing film thus obtained had high polarizing activities and exhibited good durabilities even after having been kept for a long period of time at a high temperature under a highly humid condition. $\lambda$max of the polarizing film is 630 nm.

EXAMPLE 7

Example 6 was repeated, except that the tetrakisazo compound obtained in Example 1 was replaced with the tetrakisazo compound obtained in Example 2. The polarizing film thus obtained had a wide absorption range and high polarizing activities. $\lambda$max of the polarizing film is 610 nm.

EXAMPLE 8

Example 6 was repeated, except that the tetrakisazo compound obtained in Example 1 was replaced with each of the tetrakisazo compound shown in the second column of the following Table 1–4 or a its salt. $\lambda$max of the polarizing film obtained in each of Examples is shown in the third column of Table 1–4. The polarizing film obtained in this Examples had high polarizing activities and exhibited good durabilities at a high temperature under a highly humid condition.

TABLE 1

| No. | Tetrakisazo compound | λmax (nm) |
|---|---|---|
| 1 | HO₃S—⟨⟩—N=N—⟨⟩—N=N—⟨⟩(OCH₃)(CH₃)—N=N—[naphthalene](OH)(HO₃S)—N=N—⟨⟩—OH | 610 |
| 2 | HO₃S—⟨⟩—N=N—⟨⟩(OCH₃)(CH₃O)—N=N—⟨⟩(OCH₃)(CH₃)—N=N—[naphthalene](OH)(HO₃S)—N=N—⟨⟩—OH | 630 |
| 3 | HO₃S—⟨⟩—N=N—⟨⟩(CH₃O)—N=N—⟨⟩(CH₃O)—N=N—[naphthalene](OH)(HO₃S)—N=N—⟨⟩—OH | 610 |
| 4 | (SO₃H)(SO₃H)[naphthalene]—N=N—⟨⟩(CH₃O)—N=N—⟨⟩(OCH₃)(CH₃O)—N=N—[naphthalene](OH)(HO₃S)—N=N—⟨⟩—OH | 620 |
| 5 | (SO₃H)(SO₃H)[naphthalene]—N=N—⟨⟩—N=N—⟨⟩(OCH₃)(CH₃O)—N=N—[naphthalene](OH)(HO₃S)—N=N—⟨⟩—OH | 610 |
| 6 | (SO₃H)[naphthalene]—N=N—⟨⟩—N=N—⟨⟩(OCH₃)(CH₃O)—N=N—[naphthalene](OH)(HO₃S)—N=N—⟨⟩—OH | 610 |
| 7 | HO₃S—⟨⟩—N=N—⟨⟩—N=N—⟨⟩(OCH₃)(CH₃CONH)—N=N—[naphthalene](OH)(HO₃S)—N=N—⟨⟩—OH | 600 |

TABLE 2

| No. | Tetrakisazo compound | λmax (nm) |
|---|---|---|
| 8 | (SO₃H)[naphthalene]—N=N—⟨⟩(CH₃O)—N=N—⟨⟩(OCH₃)(CH₃CONH)—N=N—[naphthalene](OH)(HO₃S)—N=N—⟨⟩—OH | 610 |
| 9 | (SO₃H)[naphthalene]—N=N—⟨⟩—N=N—⟨⟩(OCH₃)(CH₃O)—N=N—[naphthalene](OH)(HO₃S)—N=N—⟨⟩(OH)—OH | 610 |
| 10 | HO₃S—⟨⟩—N=N—⟨⟩—N=N—⟨⟩(OCH₃)(CH₃O)—N=N—[naphthalene](OH)(HO₃S)—N=N—⟨⟩—NH₂ | 610 |

TABLE 2-continued

| No. | Tetrakisazo compound | λmax (nm) |
|---|---|---|
| 11 | (structure) | 610 |
| 12 | (structure) | 630 |
| 13 | (structure) | 610 |
| 14 | (structure) | 630 |

TABLE 3

| No. | Tetrakisazo compound | λmax (nm) |
|---|---|---|
| 15 | (structure) | 630 |
| 16 | (structure) | 620 |
| 17 | (structure) | 610 |
| 18 | (structure) | 650 |
| 19 | (structure) | 650 |

TABLE 3-continued

| No. | Tetrakisazo compound | λmax (nm) |
|---|---|---|
| 20 | HO₃S—⟨C⟩—N=N—⟨C⟩—N=N—⟨C⟩(CH₃O, O—Cu—O)—N=N—⟨naphthalene⟩(HO₃S)—N=N—⟨C⟩(OH, OH) | 650 |

TABLE 4

| No. | Tetrakisazo compound | λmax(nm) |
|---|---|---|
| 21 | HO₃S—⟨C⟩—N=N—⟨C⟩(OCH₃, H₃CO)—N=N—⟨C⟩(OCH₃, H₃CO)—N=N—⟨naphthalene⟩(OH, HO₃S)—N=N—⟨C⟩—NH₂ | 630 |
| 22 | HO₃S—⟨C⟩—N=N—⟨C⟩(H₃CO)—N=N—⟨C⟩(OCH₃, H₃CO)—N=N—⟨naphthalene⟩(OH, HO₃S)—N=N—⟨C⟩—NH₂ | 620 |
| 23 | HOOC—⟨C⟩—N=N—⟨C⟩(OCH₃, H₃CO)—N=N—⟨C⟩(OCH₃, H₃CO)—N=N—⟨naphthalene⟩(OH, HO₃S)—N=N—⟨C⟩—NH₂ | 630 |
| 24 | HOOC—⟨C⟩—N=N—⟨C⟩(OCH₃, H₃CO)—N=N—⟨C⟩(OCH₃, H₃CO)—N=N—⟨naphthalene⟩(OH, HO₃S)—N=N—⟨C⟩—OH | 630 |
| 25 | HOOC—⟨C⟩—N=N—⟨C⟩—N=N—⟨C⟩(H₃CO, O—Cu—O)—N=N—⟨naphthalene⟩(HO₃S)—N=N—⟨C⟩—OH | 650 |
| 26 | HOOC—⟨C⟩—N=N—⟨C⟩—N=N—⟨C⟩(H₃CO, O—Cu—O)—N=N—⟨naphthalene⟩(HO₃S)—N=N—⟨C⟩—NH₂ | 650 |

EXAMPLE 9

A polyvinyl alcohol film of 75 μm in thickness (Kuraray Vinylon #7500 manufactured by Kuraray Co., Ltd.) was stretched to four times of its original length in a longitudinal uniaxial direction to prepare the substrate of a polarizing film. As kept in the tensioned state, the resulting film was dipped into aqueous solution of sodium salt of dye No. 22 in Table 4, Example 8, sodium salt of dye of formula(A-5), C.I. direct orange 39 and sodium sulfate, wherein the concentrations of the dye No. 22 in Table 4, the dye of formula(A-5), C.I. direct orange 39 and sodium sulfate are 0.017%, 0.0035%, 0.004% and 2%, respectively, at 60° C. for 10 minutes. Thereafter, the film was dipped into 7.5% aqueous boric acid solution at 65° C. for 10 minutes and then washed with 20° C. water for 30 seconds to obtain a polarizing film. The polarizing film thus obtained has a neutral color and no discoloration was observed even after having been kept for a long period of time at a high temperature under a highly humid condition.

EXAMPLE 10

A polyvinyl alcohol film of 75 μm in thickness (Kutsray Vinylon #7500 manufactured by Kuraray Co., Ltd.) was stretched to four times of its original length in a longitudinal uniaxial direction to prepare the substrate of a polarizing film. As kept in the tensioned state, the resulting film was dipped into aqueous solution of sodium salt of dye No. 21 in Table 4, Example 8, sodium salt of dye of formula(A-5), C.I. direct orange 39 and sodium sulfate, wherein the concentrations of the dye No. 21 in Table 4, the dye of formula(A-5), C.I. direct orange 39 and sodium sulfate are 0.025%, 0.007%, 0.0085% and 2%, respectively, at 65° C. for 10 minutes. Thereafter, the film was dipped into 7.5% aqueous boric acid solution at 65° C. for 10 minutes and then washed with 20° C. water for 30 seconds to obtain a polarizing film. The polarizing film thus obtained has a neutral color and no discoloration was observed even after having been kept for a long period of time at a high temperature under a highly humid condition.

What we claim is:

1. A tetrakisazo compound represented by the following formulae (I) or (II):

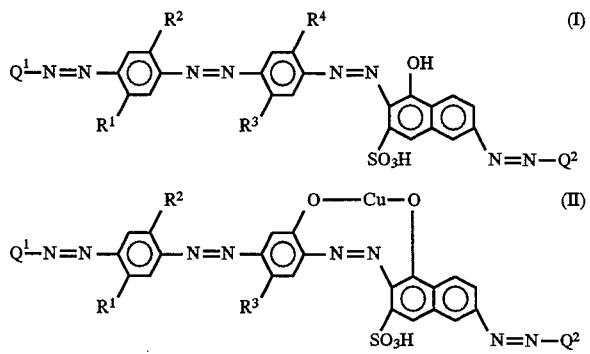

wherein $Q^1$ represents a substituted or unsubstituted phenyl group or a substituted or unsubstituted naphthyl group, $Q^2$ represents a phenyl group which is substituted by at least one substituent selected from a hydroxy group, a substituted amino group and an unsubstituted amino group, and which may be further substituted, and $R^1$, $R^2$, $R^3$ and $R^4$ each independently represents a hydrogen atom, a hydroxy group, a lower alkyl group, a lower alkoxy group or a substituted or unsubstituted amino group; or a salt thereof.

2. A tetrakisazo compound according to claim 1 wherein $Q^1$ is an unsubstituted phenyl, or a phenyl group substituted by one or two substituent selected from a nitro, sulfo, sulfamoyl, $C_1$–$C_4$ alkyl, $C_1$–$C_4$ alkoxy, hydroxy, unsubstituted or substituted amino, carboxy or halogeno group.

3. A tetrakisazo compound according to claim 1 wherein $Q^1$ is an unsubstituted 2-naphthyl group or 2-naphthyl group substituted by one, two or three substituent selected from a hydroxy group and a sulfo group.

4. A tetrakisazo compound according to claim 1 wherein $Q^2$ is a phenyl group which is substituted once, twice or three times by hydroxy groups, and which may be further substituted by an unsubstituted or substituted amino group or a sulfo, alkyl, alkoxy or carboxy group.

5. A tetrakisazo compound according to claim 1 wherein $Q^2$ is 4-hydroxyphenyl.

6. A tetrakisazo compound according to claim 1 wherein $Q^2$ is a phenyl group which is substituted once or twice by an unsubstituted or substituted amino groups, and which may be further substituted by a hydroxy, sulfo, alkyl, alkoxy or carboxy group.

7. A tetrakisazo compound according to claim 1 which is represented by the formula (I) wherein $R^1$, $R^2$, $R^3$ and $R^4$ each independently represents a hydrogen atom, a hydroxy, methyl, ethyl, methoxy, ethoxy, acetylamino, methylsulfonyl amino, ureido and methyl amino group.

8. A tetrakisazo compound according to claim 1 which is represented by the formula (II) wherein $R^1$, $R^2$ and $R^3$ each independently represents a hydrogen atom, a hydroxy, methyl, ethyl, methoxy, ethoxy, acetylamino, methylsulfonyl amino, ureido and methyl amino group.

9. A dye which comprises a tetrakisazo compound according to claim 1.

10. A dye according to claim 9 which is to be incorporated into a polarizing film.

11. A polarizing film which comprises a dye according to claim 10.

12. A polarizing film which comprises a dye according to claim 10 and further comprises an organic dye other than a dye according to claim 10.

13. A polarizing film according to claim 12 which further comprises two or more dyes selected from:

[A] a trisazo dye which is a dye represented by the formula (Ia), a copper complex salt thereof or a salt of the dye of the formula (Ia) or of the copper complex salt:

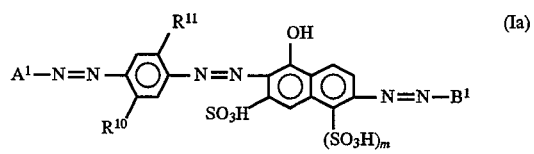

wherein:

$A^1$ and $B^1$, which are the same or different, each represent a substituted or unsubstituted phenyl group or a substituted or unsubstituted naphthyl group;

$R^{10}$ represents an amino group which may be optionally substituted, a hydrogen atom, a lower alkyl, lower alkoxy or sulfo group;

$R^{11}$ represents a hydrogen atom, a hydroxy or lower alkoxy group;

and m is 0 or 1; and

[B] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

14. A polarizing film according to claim 13 which comprises one dye of formula (I), one dye selected from group [A], and one dye selected from group[B].

15. A polarizing film according to claim 11 wherein its substrate is a film made from polyvinyl alcohol or a derivative thereof.

* * * * *